United States Patent
Sato et al.

(10) Patent No.: US 9,469,335 B2
(45) Date of Patent: Oct. 18, 2016

(54) REAR WHEEL STEERING APPARATUS FOR VEHICLE

(71) Applicant: AISIN SEIKI KABUSHIKI KAISHA, Kariya-shi (JP)

(72) Inventors: Teruhide Sato, Toyota (JP); Shimpei Fujii, Anjo (JP); Akiya Taneda, Anjo (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 153 days.

(21) Appl. No.: 14/288,599

(22) Filed: May 28, 2014

(65) Prior Publication Data

US 2014/0353066 A1 Dec. 4, 2014

(30) Foreign Application Priority Data

May 29, 2013 (JP) .................. 2013-112491

(51) Int. Cl.
*B62D 5/04* (2006.01)
*B60G 7/00* (2006.01)
(Continued)

(52) U.S. Cl.
CPC ............. *B62D 5/0403* (2013.01); *B60G 7/006* (2013.01); *B62D 5/0415* (2013.01); *B62D 7/08* (2013.01); *B62D 7/1581* (2013.01); *B60G 2200/44* (2013.01); *B60G 2200/46* (2013.01); *B60G 2200/462* (2013.01); *B60G 2202/42* (2013.01);
(Continued)

(58) Field of Classification Search
CPC ........ B62D 5/0406; B62D 7/00; B62D 7/16; B62D 7/163; B62D 5/0403; B60G 7/00
See application file for complete search history.

(56) References Cited

U.S. PATENT DOCUMENTS

| 4,793,447 A | 12/1988 | Taig et al. |
| 5,086,861 A * | 2/1992 | Peterson ............. B62D 7/1581 180/445 |
| 5,506,776 A | 4/1996 | Fushimi et al. |

(Continued)

FOREIGN PATENT DOCUMENTS

| EP | 0 667 279 A1 | 8/1995 |
| EP | 1 970 598 A1 | 9/2008 |

(Continued)

OTHER PUBLICATIONS

U.S. Appl. No. 14/289,070, filed May 28, 2014, Aisin Seiki Kabushiki Kaisha.

(Continued)

*Primary Examiner* — Joseph Rocca
*Assistant Examiner* — Daniel Yeagley
(74) *Attorney, Agent, or Firm* — Buchanan Ingersoll & Rooney PC (57) ABSTRACT

A rear wheel steering apparatus for a vehicle includes a housing, an electric motor, a planetary gear mechanism, a linear motion mechanism including a nut member and a rod threadedly engaged with the nut member, the housing including a cylindrical body which includes a lock portion provided at an inner surface of the cylindrical body, the housing including a connection cover, a cylindrical holding member holding a ring gear within the cylindrical body in a state where the ring gear is prevented from rotating, and a bearing, wherein the bearing and the cylindrical holding member are disposed and held between the lock portion and the connection cover, and the cylindrical holding member is held to be non-rotatable relative to the cylindrical body.

15 Claims, 6 Drawing Sheets (51) Int. Cl.
*B62D 7/15* (2006.01)
*B62D 7/08* (2006.01)

(52) U.S. Cl.
CPC ..... *B60G 2202/422* (2013.01); *B60G 2204/62* (2013.01)

(56) References Cited

U.S. PATENT DOCUMENTS

| | | | |
|---|---|---|---|
| 5,595,089 A | | 1/1997 | Watanabe et al. |
| 5,988,311 A | * | 11/1999 | Kuribayashi ........ B62D 5/0448 180/444 |
| 6,024,187 A | * | 2/2000 | Takeda ................... G01C 21/28 180/408 |
| 6,041,886 A | * | 3/2000 | Nakaishi .............. B62D 5/0427 180/443 |
| 8,607,920 B2 | | 12/2013 | Jungbecker et al. |
| 8,613,683 B2 | * | 12/2013 | Bidare ..................... F03G 7/00 475/149 |
| 2002/0195294 A1 | * | 12/2002 | Taneda ................... B62D 7/148 180/445 |
| 2004/0026158 A1 | * | 2/2004 | Rieth .................... B62D 5/003 180/402 |
| 2008/0223160 A1 | | 9/2008 | Yamaguchi |
| 2011/0284313 A1 | * | 11/2011 | Jungbecker ........... B60G 7/006 180/444 |

FOREIGN PATENT DOCUMENTS

| | | |
|---|---|---|
| FR | 2 862 937 A1 | 6/2005 |
| JP | 3068779 B2 | 7/2000 |
| JP | 3206783 B2 | 9/2001 |
| JP | 3028905 B2 | 4/2002 |
| JP | 2012-511465 A | 5/2012 |
| JP | 5098242 B2 | 12/2012 |
| WO | 88/04741 A1 | 6/1988 |
| WO | WO 2010/066732 A1 | 6/2010 |

OTHER PUBLICATIONS

The extended European Search Report issued on Oct. 6, 2014, by the European Patent Office in corresponding European Patent Application No. 14170101.1-1755. (6 pages).

* cited by examiner

REAR WHEEL STEERING APPARATUS FOR VEHICLE

CROSS REFERENCE TO RELATED APPLICATIONS

This application is based on and claims priority under 35 U.S.C. §119 to Japanese Patent Application 2013-112491, filed on May 29, 2013, the entire content of which is incorporated herein by reference.

TECHNICAL FIELD

This disclosure generally relates to a rear wheel steering apparatus for a vehicle.

BACKGROUND DISCUSSION

Recently, various types of rear wheel steering apparatuses each constituting a portion of a four-wheel steering system (4WS) for a vehicle are known. Such rear wheel steering apparatus, for example, as disclosed in JP5098242B, which will be hereinafter referred to as Reference 1, basically includes a rod connected to a rear wheel of a vehicle, a housing supporting the rod and fixed to a chassis of the vehicle, and a motor accommodated within the housing and driving the rod to steer rear wheels. The rear wheel steering apparatus of Reference 1 is provided with a deceleration mechanism which converts a rotary motion of the motor to a linear motion of the rod, and transmits the motion. As an example of the deceleration mechanism, a planetary gear mechanism is disclosed in Reference 1. In addition, a planetary gear mechanism is applied to a rear wheel steering apparatus described in JP3068779B, which will be hereinafter referred to as Reference 2. According to Reference 2, for example, a ring gear constituting the planetary gear mechanism is made of resin material.

Further, according to a description of JP2012-511465A, which will be hereinafter referred to as Reference 3, a planetary gear mechanism is applied to a transmission for converting a rotary motion of an electric motor to a translational motion of a push rod, and a ring gear of the planetary gear mechanism is press-fitted to an outer ring of a thrust bearing of a ball screw. In addition, a steering device of Reference 3 is provided with a blocking device which connects/disconnects transmission of a drive force from the electric motor to the push rod. The blocking device is supported, together with the electric motor and the transmission, at a module housing.

At the apparatus and the device which are disclosed in Reference 1 and Reference 3, respectively, the ring gear of the planetary gear mechanism is made of metal and is press-fitted to the housing as a conventional mounting means. Thus, a process of press-fitting is needed, which is a factor for increasing costs. In a case where the ring gear is made of the resin material as described in Reference 2, the apparatus is made inexpensively, however, forming the ring gear inside the housing so that the ring gear is integral with the inside of the housing is not easy. The apparatus of Reference 2 is characterized in that gears are made of different resin materials from one another.

In addition, according to each of References 1 and 2, a structure for supporting the rod is a so-called both-ends-supported structure, that is, the rod is supported at both ends, and thus the supporting structure of the rod is complicated. In a case where the supporting structure of the rod is modified to be a one-end-supported structure where the rod is supported at one end, inefficiency occurs in an assembling process of other part or component of the device. On the other hand, the device described in Reference 3 may be categorized into the one-end-supported structure, however, a high strength is required because the device includes a structure where the electric motor, the transmission and the blocking device are supported at the module housing. This results in an increase in a size of the housing.

A need thus exists for a rear wheel steering apparatus for a vehicle, which is not susceptible to the drawback mentioned above.

SUMMARY

According to an aspect of this disclosure, a rear wheel steering apparatus for a vehicle, the rear wheel steering apparatus configured to be mounted on a suspension mechanism that supports rear wheels of the vehicle and steering the rear wheels, the rear wheel steering apparatus includes a housing configured to be connected via a first connection member and a second connection member to the suspension mechanism, an electric motor accommodated within the housing, a planetary gear mechanism including a sun gear connected to an output shaft of the electric motor, a ring gear supported within the housing to be non-rotatable, a planetary gear meshing with the ring gear and the sun gear, and a carrier connected to the planetary gear, the planetary gear mechanism decelerating an output of the electric motor, a linear motion mechanism including a nut member connected to the planetary gear mechanism and constituting the carrier, and a rod threadedly engaged with the nut member and connected to the second connection member, the linear motion mechanism converting a rotary motion of the nut member to a linear motion of the rod, the housing including a cylindrical body which accommodates the electric motor and the planetary gear mechanism in a state where the electric motor and the planetary gear mechanism are arranged in tandem with each other and which includes a lock portion provided at an inner surface of the cylindrical body to be positioned between the electric motor and the planetary gear mechanism, the housing including a connection cover including the first connection member and closing an opening portion of the cylindrical body, a cylindrical holding member holding the ring gear within the cylindrical body in a state where the ring gear constituting the planetary gear mechanism is prevented from rotating, and a bearing supporting the nut member in a manner that the nut member is rotatable relative to the cylindrical holding member, wherein the bearing and the cylindrical holding member are disposed and held between the lock portion of the cylindrical body and the connection cover, and the cylindrical holding member is held to be non-rotatable relative to the cylindrical body.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
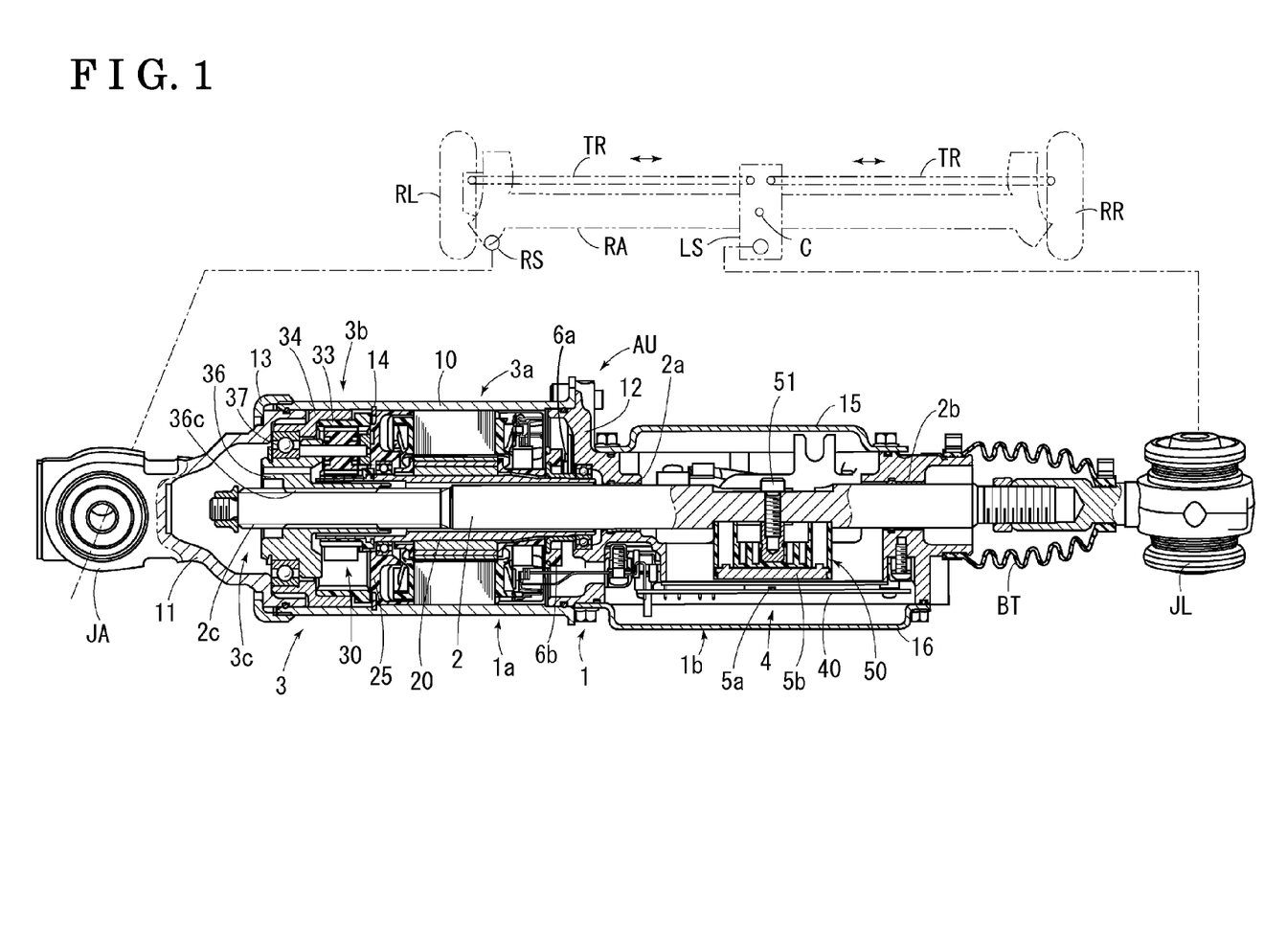
FIG. 1 is a transverse cross-sectional view of an entire configuration of a rear wheel steering apparatus according to an embodiment disclosed here.

An embodiment disclosed here will be explained with reference to the drawings. FIG. 1 illustrates an entire configuration of a rear wheel steering apparatus according to the embodiment of this disclosure. The rear wheel steering apparatus of the present embodiment constitutes a portion of a four-wheel steering system (4WS), of which a front wheel steering apparatus including a known configuration is omitted. In addition, various types of suspension mechanisms are considered for supporting rear wheels of a vehicle. According to the present embodiment, a suspension mechanism for supporting the rear wheel of the vehicle is configured as illustrated by a chain double-dashed line in FIG. 1. Specifically, an actuator unit AU constituting the rear wheel steering apparatus of the present embodiment is arranged between a support portion RS relative to a rear axle RA supporting rear wheels RL and RR, and a link LS pivotally supported by the rear axle RA to rotate about a center C. Accordingly, a portion between the support portion RS and the link LS is driven to expand and contract, thereby steering the rear wheels RL and RR via tie rods TR and TR in association with the rotation of the link LS.

In the actuator unit AU, a rod 2 is supported by a housing 1 in an axially movable manner, i.e., to perform a linear motion. One end portion of the rod 2 is connected to the link LS via a ball joint JL. The housing 1 is connected to the support portion RS via a ball joint JA. An actuator 3 drives the rod 2 so that the portion between the support portion RS of the rear axle RA and the link LS is driven in the expansion and contraction manner. Specifically, an electric motor 3a constituting the actuator 3 is controlled by a controller 4 in a state where a rotation output of the electric motor 3a is reduced or decelerated by a deceleration mechanism 3b and is then converted to a linear motion of the rod 2 via a linear motion mechanism 3c. According to the present embodiment, the electric motor 3a is constituted by a brushless motor. The ball joint JA serves as a first connection member while the ball joint JL serves as a second connection member.

According to the present embodiment, the housing 1 includes a first housing 1a that basically houses components of the actuator 3, for example, the electric motor 3a, and a second housing 1b that basically houses components of the controller 4, for example, an electronic circuit board 40. A connection cover 11 is connected to a cylindrical body 10 constituting the first housing 1a while a case 12 constituting the second housing 1b and including opening portions at upper and lower sides in a vertical direction and at both sides in an axial direction of the case 12 is connected to the cylindrical body 10. First and second cover portions 15 and 16 are connected to the opening portions of the case 12 at the upper and lower sides in the vertical direction of the case 12. The housing 1 of the present embodiment is made of metal while the connection cover 11 and the case 12 are made of aluminum. The cylindrical body 10, the first and second cover portions 15 and 16 are made of iron.

Figure 2:
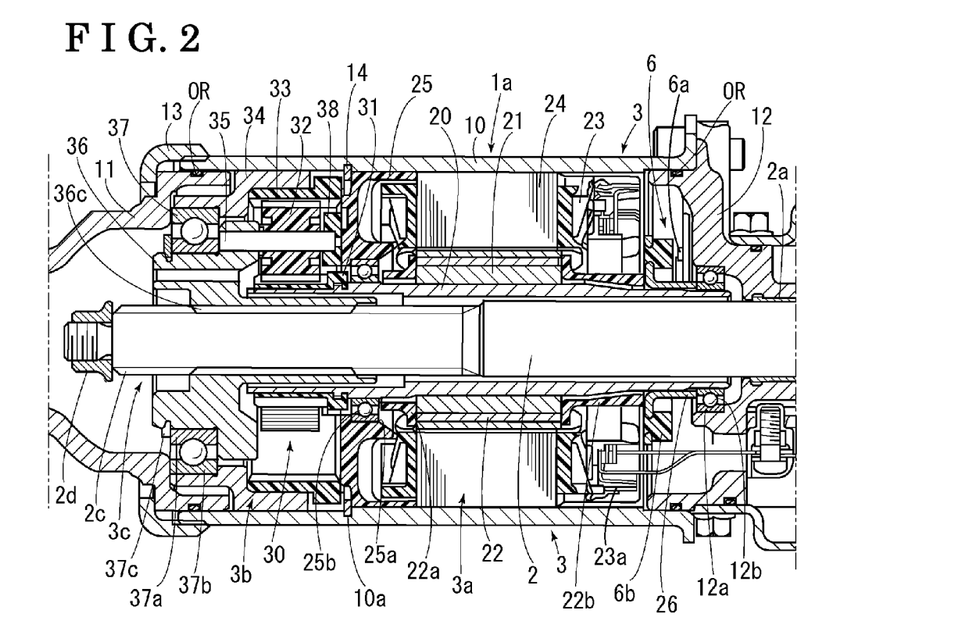
FIG. 2 is an enlarged transverse cross-sectional view of an actuator portion of the embodiment.

The actuator 3 includes a configuration illustrated in FIG. 2 in an enlarged manner, and is press-fitted and fixed within the cylindrical body 10 in a state where a coil 23 is wound on a stator 24. An output shaft of the electric motor 3a is formed by a hollow rotation shaft 20 that is rotatably supported by an inner diameter portion 25a of a motor cover 25 inserted into the cylindrical body 10 and formed in an annular form, and by an annular groove 12a formed at the case 12 via bearings 25b and 12b respectively. A core 21 which constitutes a rotor of the electric motor 3a is press-fitted and fixed to an axially intermediate portion of the hollow rotation shaft 20. Permanent magnets 22 are arranged at even intervals in a circumferential direction of the core 21.

Further, the rod 2 is coaxially arranged within the hollow rotation shaft 20 so as to be movable relative to the housing 1 in an axial direction of the rod 2, i.e., to perform the linear motion, and to be non-rotatable relative to the housing 1. A structure of supporting the rod 2 will be described below. Bushes 2a and 2b are disposed between the rod 2 and a support portion of the case 12 for reducing a sliding resistance so that the rod 2 smoothly performs the axial movement. That is, the present embodiment includes an expansion and contraction mechanism supported at one end. Thus, each of the bushes 2a and 2b does not need to function as a bearing in an axially moving mechanism supported at both ends.

The deceleration mechanism 3b according to the present embodiment is constituted by a planetary gear mechanism 30. The planetary gear mechanism 30 includes a sun gear 31 serving as an external gear, a ring gear 33 serving as an internal gear, and a planetary gear 32 serving as an external gear. The sun gear 31 is integrally connected to the hollow rotation shaft 20 and is supported to be rotatable with the hollow rotation shaft 20. The ring gear 33 is fixed to a holder 34 serving as a cylindrical holding member. The planetary gear 32 is meshed with the sun gear 31 and the ring gear 33 to rotate around the sun gear 31. A nut member 36 serving as a carrier for rotatably supporting the planetary gear 32 via a pin 35 is rotatably supported by the holder 34 via a bearing 37 (i.e., a bearing). The bearing 37 serves as a ball bearing including an inner ring 37a fitted to the nut member 36 and an outer ring 37b fitted to the holder 34. The bearing 37 is held at the nut member 36 by means of a spacer 37c in a C-shape.

According to the present embodiment, the holder 34 and the pin 35 are made of metal, for example, made of iron. The sun gear 31, the planetary gear 32, and the ring gear 33 are made of synthetic resin. The sun gear 31 is integrally formed at the hollow rotation shaft 20 made of metal. The ring gear 33 is supported by the holder 34 to be non-rotatable thereto. The holder 34 is supported by the cylindrical body 10 to be non-rotatable thereto. That is, as illustrated in FIG. 2, a snap ring 14 (i.e., a lock portion) is held at an annular groove 10a formed within the cylindrical body 10. That is, the snap ring 14 is provided at an inner surface of the cylindrical body 10. A lock nut 13, which is formed in an annular shape, is threadedly engaged with a threaded portion provided at an opening end of the cylindrical body 10 at one side where the deceleration mechanism 3b is provided (i.e., a left side in FIG. 2) in a state where the outer ring 37b of the bearing 37 and the holder 34 are disposed and held between an annular side surface of the snap ring 14 and an annular opening end surface of the connection cover 11. Then, the cylindrical body 10 and the connection cover 11 are tightened to each other. The outer ring 37b of the bearing 37 and the holder 34 are disposed between the snap ring 14 and the connection cover 11, and are held therebetween strongly by a pressing force in the axial direction which is generated by the engagement of the lock nut 13 with the cylindrical body 10. Consequently, the holder 34 is held by the cylindrical body 10 to be non-rotatable thereto. Instead of the annular groove 10a and the snap ring 14, a annular step may be formed at an inner peripheral surface of the cylindrical body 10 so that the step serves as the lock portion.

The nut member 36 and the rod 2 are arranged in a state where an external thread portion 2c formed by a trapezoidal screw at an outer peripheral surface of one end portion of the rod 2 over a predetermined axial length is threadedly engaged with an internal thread portion 36c formed at an inner peripheral surface of the nut member 36. The nut member 36 and the rod 2 constitute the linear motion mechanism 3c. In order to inhibit the rod 2 from being dislocated, a nut 2d is screwed at and attached to an end of the external thread portion 2c. Because the rod 2 is supported in the aforementioned manner, an axial load that may be applied to the rod 2 is absorbed by the cylindrical body 10 and the connection cover 11 via the nut member 36, the bearing 37, the holder 34, and the snap ring 14.

Figure 3:
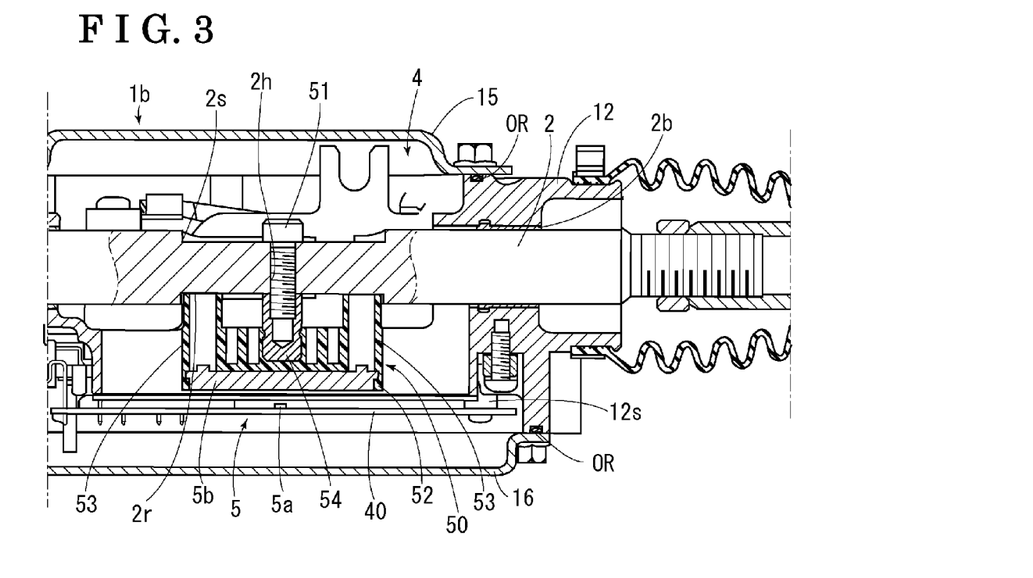
FIG. 3 is an enlarged transverse cross-sectional view of a controller portion of the embodiment.

As illustrated in FIG. 3, as the controller 4, the electronic circuit board 40 constituting an electronic control unit and a magnet block 50 constituting a displacement detection device 5 are accommodated within the second housing 1b. The displacement detection device 5 includes a displacement sensor 5a constituted by a magnetic vector sensor, for example, and a permanent magnet 5b constituted by a neodymium magnet, for example. The displacement sensor 5a is supported by the electronic circuit board 40 while the permanent magnet 5b is held within the magnet block 50. The magnet block 50 includes a function for detecting an axial displacement of the rod 2 when the rod 2 performs the linear motion and a function for inhibiting the rotation of the rod 2.

Figure 4:
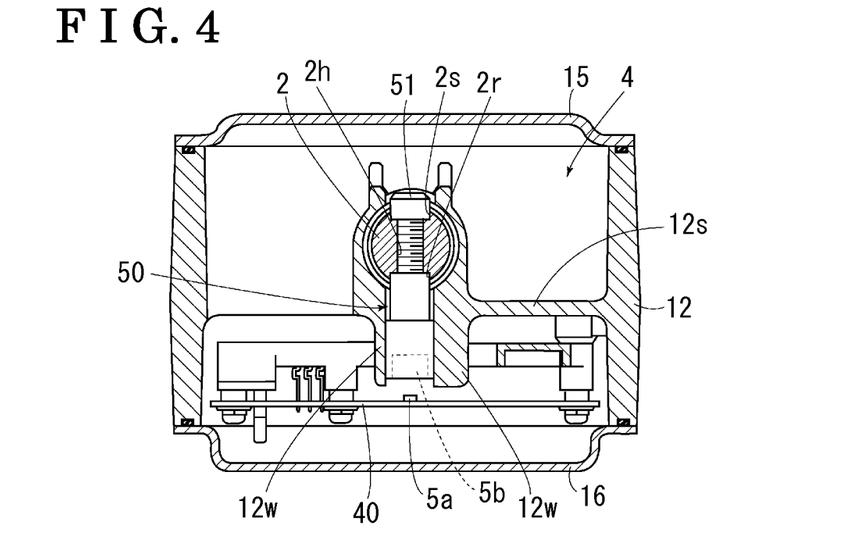
FIG. 4 is an enlarged longitudinal cross-sectional view of the controller portion of the embodiment.

As illustrated in FIGS. 3 and 4, elongated grooves 2r and 2s each elongated in the axial direction of the rod 2 (that is, recessed portions each formed in a substantially rectangular shape) are formed at an outer peripheral surface of the rod 2 so as to face each other in a radial direction of the rod 2. The magnet block 50 is arranged at one of the elongated grooves 2r and 2s, that is, at the elongated groove 2r. A bolt 51 is inserted from the other one of the elongated grooves 2r and 2s which is positioned opposite to the elongated groove 2r, that is, the bolt 51 is inserted from the elongated groove 2s, and is fastened to the rod 2. The magnet block 50 is made of synthetic resin. As illustrated in FIG. 3, the magnet block 50 is provided with a holding portion 52 accommodating therein the permanent magnet 5b, and is provided with a pair of leg portions 53 and 53 each formed so as to extend from each end of the holding portion 52. A nut 54, which is made of metal, is insert-molded in the magnet block 50 to be positioned between the leg portions 53 and 53. On the other hand, as illustrated in FIG. 4, a supporting portion 12s is provided within the case 12, and a pair of standing wall portions 12w and 12w is provided to be parallel to an axis of the rod 2. The holding portion 52 is assembled so as to be held between the pair of standing wall portions 12w and 12w. The bolt 51 is fitted in a through hole 2h of the rod 2 by insertion and is threadedly engaged with the nut 54. As a result, by means of the magnet block 50, the rod 2 is supported to be non-rotatable relative to the standing wall portions 12w and 12w of the case 12, and therefore the rod 2 is supported to be non-rotatable relative to the housing 1.

According to the actuator 3 of the present embodiment, in a case where the hollow rotation shaft 20 is driven to rotate by the electric motor 3a, the rotation output of the electric motor 3a is reduced or decelerated by the deceleration mechanism 3b of the planetary gear mechanism 30 to thereby drive the nut member 36 to rotate. Then, the rotary motion of the nut member 36 is converted to the linear motion of the rod 2 by the linear motion mechanism 3c. As a result, the portion between the support portion RS of the rear axle RA and the link LS is driven in the expansion and contraction manner to adjust a steering angle of the rear wheels as explained above.

Figure 5:
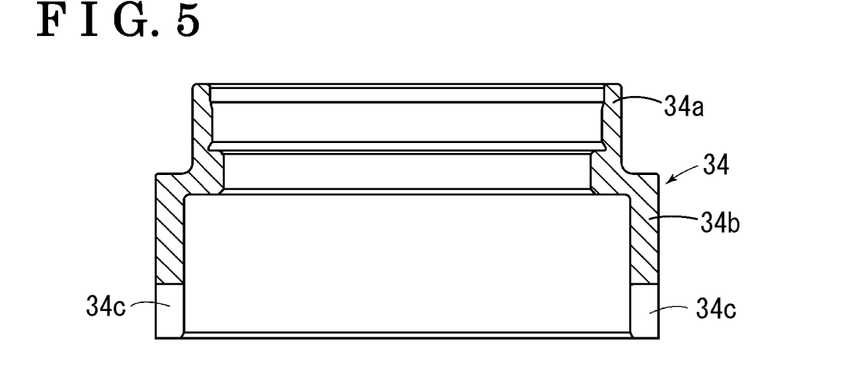
FIG. 5 is a transverse cross-sectional view of a holder constituting a deceleration mechanism of the embodiment.

Here, a structure of supporting the ring gear 33 relative to the holder 34 will be described. First, the holder 34 is formed in a stepped cylindrical shape as illustrated in FIG. 5. The holder 34 includes grooves 34c and 34c each provided at a side wall (a peripheral wall) of the holder 34 in a cut-out configuration opening in an axial direction of the holder 34, and opening at an outer peripheral surface and an inner peripheral surface of the holder 34. Each of the grooves 34c and 34c may be formed in a configuration opening at the inner peripheral surface of the holder 34 (without opening at the outer peripheral surface). Each of the grooves 34c and 34c serves as a locking portion.

Figure 6:
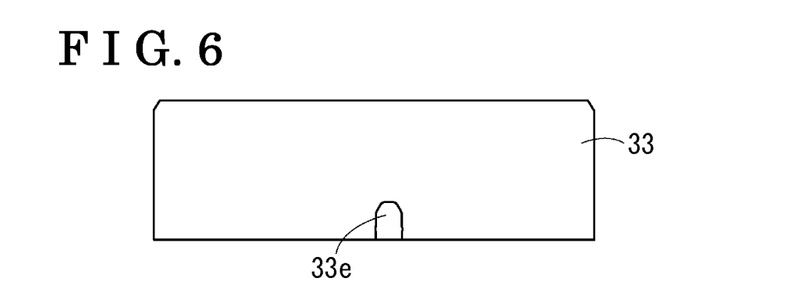
FIG. 6 is a front view of a ring gear constituting the deceleration mechanism of the embodiment.
Figure 7:
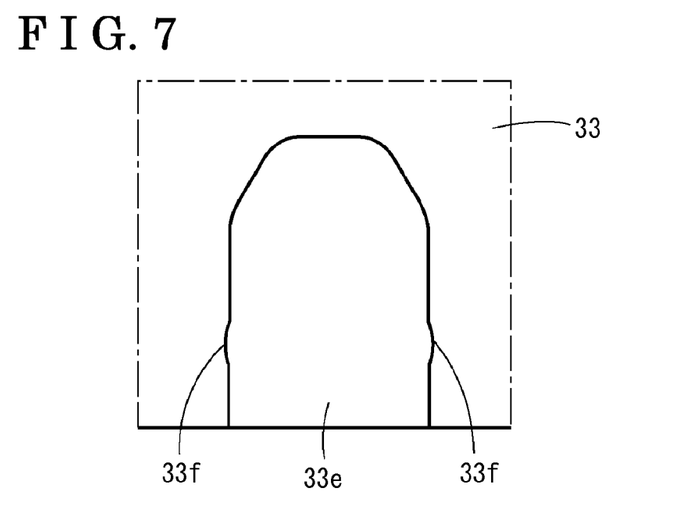
FIG. 7 is an enlarged front view illustrating an engagement portion of the ring gear constituting the deceleration mechanism of the embodiment.
Figure 8:
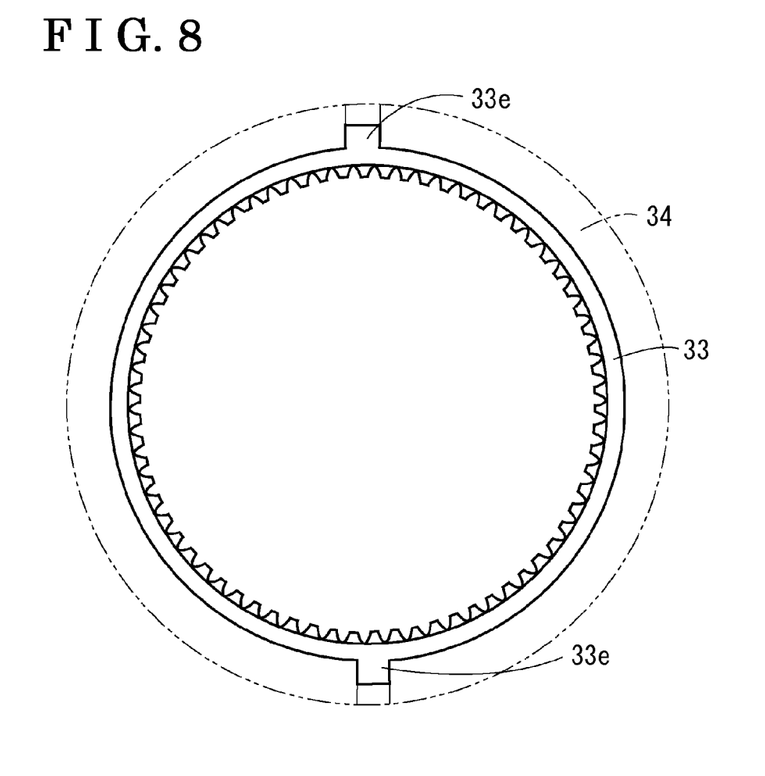
FIG. 8 is a side view of the ring gear constituting the deceleration mechanism of the embodiment.

On the other hand, the ring gear 33 includes a configuration illustrated in each of FIGS. 6 to 8. The ring gear 33 is fitted in the holder 34 to be integral with each other. As illustrated in FIG. 8, the ring gear 33 of the present embodiment includes a pair of engagement portions 33e and 33e formed integrally with the ring gear 33. The engagement portions 33e and 33e are formed to protrude outwardly in a radial direction of the ring gear 33, and are positioned to face with each other in the radial direction. A length (i.e., height) of each engagement portion 33e in the radial direction of the ring gear 33 and a length of each engagement portion 33e in an axial direction of the ring gear 33 are set to be smaller than a length (i.e., height) of each groove 34c of the holder 34 in a radial direction of the holder 34 and a length of each groove 34c in the axial direction of the holder 34, respectively.

Figure 9:
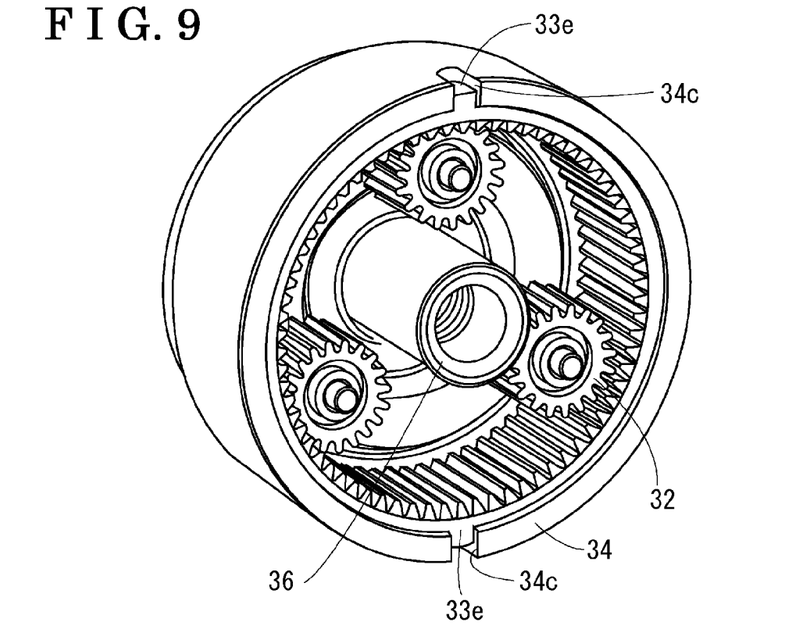
FIG. 9 is a perspective view illustrating a portion of the deceleration mechanism of the embodiment.
Figure 10:
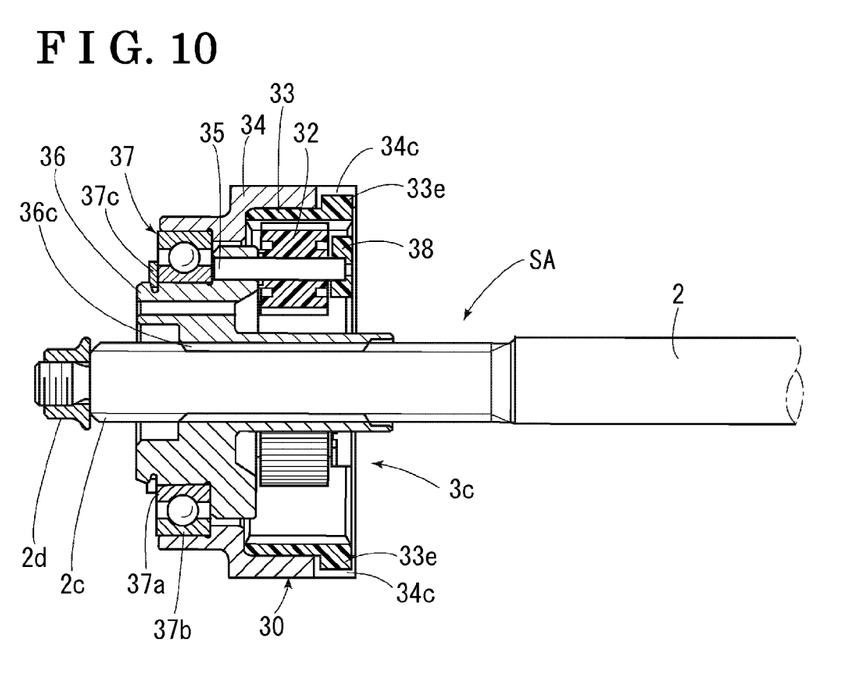
FIG. 10 is a longitudinal cross-sectional view of a sub-assembly constituting a portion of the actuator of the embodiment.
Figure 11:
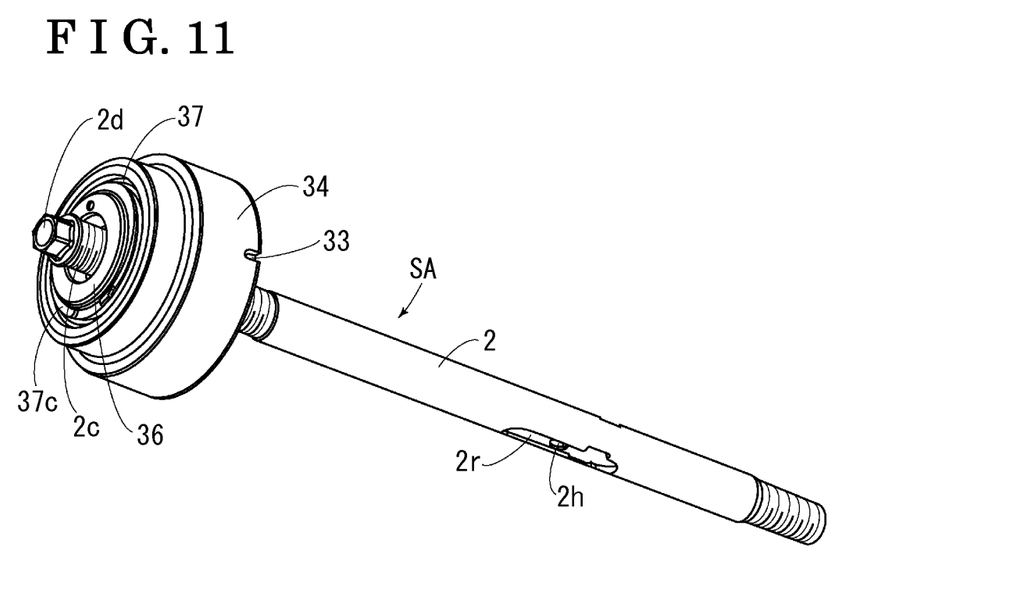
FIG. 11 is a perspective view of the sub-assembly constituting the portion of the actuator of the embodiment.

As illustrated in FIG. 7 in which a part of the ring gear 33 is illustrated in an enlarged manner, each of the engagement portions 33e and 33e is provided with protrusions 33f and 33f each formed at each outer side surface of the engagement portion 33e in a circumferential direction of the ring gear 33. Thus, when the ring gear 33 is brought to be accommodated within the holder 34, the ring gear 33 is fitted to the holder 34 while the protrusions 33f and 33f of each engagement portion 33e are pressed by inner side surfaces of the corresponding groove 34c, respectively as illustrated in FIGS. 8 and 9. As a result, as illustrated in FIGS. 9 and 10, the ring gear 33 is held at the holder 34 in a state where an end surface of the ring gear 33 in the radial direction and an end surface of the ring gear 33 in the axial direction are positioned inside relative to an end surface of the holder 34 in the radial direction and an end surface of the holder 34 in the axial direction. Then, the planetary gear 32 and the nut member 36 are assembled on the holder 34, to which the ring gear 33 is fitted, in a state illustrated in FIG. 9. Further, by attaching the bearing 37, the rod 2, and so forth, a subassembly SA is configured as illustrated in FIGS. 10 and 11.

A portion of a manufacturing method of the actuator unit AU including the aforementioned configuration will be explained. First, the stator 24 on which the coil 23 is wound is press-fitted within the cylindrical body 10 by a press-fitting device and is then fixed to a predetermined position illustrated in FIG. 2. The motor cover 25 is inserted into the cylindrical body 10 and the snap ring 14 is fixed to the annular groove 10a within the cylindrical body 10. Aside from the aforementioned process, the bearing 25b is press-fitted to the hollow rotation shaft 20 at which the sun gear 31 is integrally formed, and thereafter a first pressing member 22a made of resin for holding the permanent magnets 22 is press-fitted to the hollow rotation shaft 20, and the core 21 is press-fitted to the hollow rotation shaft 20 and is secured thereat. The permanent magnets 22 are then accommodated within the core 21, and magnetized in a sub-assembly state where a second pressing member 22b is press-fitted to the hollow rotation shaft 20.

Next, the aforementioned hollow rotation shaft 20 is inserted into a hollow portion of the stator 24 so that the bearing 25b is held in a state where the bearing 25b is fitted to a hollow portion of the motor cover 25. Further, a support member 26 to which a plastic magnet 6b for a magnetic pole sensor 6 is fixedly attached is press-fitted to an end portion of the hollow rotation shaft 20. After the plastic magnet 6b is magnetized, the case 12 is connected to an opening portion of the cylindrical body 10 which faces the electric motor 3a (i.e., at a right side in FIG. 2) so that the case 12 and the cylindrical body 10 are connected to each other by a bolt. An outer ring of the bearing 12b is press-fitted to the annular groove 12a of the case 12. When the case 12 is connected to the cylindrical body 10, an inner ring of the bearing 12b is fitted to the hollow rotation shaft 20.

In addition, the inner ring 37a of the bearing 37 is fitted to the nut member 36 to be held by the spacer 37c while the outer ring 37b of the bearing 37 is fitted to the holder 34. Then, the ring gear 33 is attached to the holder 34 and the planetary gear 32 is supported by the nut member 36 by the pin 35 as illustrated in FIG. 10. An engagement member 38 is then engaged with the pin 35. The external thread portion 2c of the rod 2 is threadedly engaged with the internal thread portion 36c of the nut member 36, and the nut 2d is screwed and attached to the end portion of the external thread portion 2c to thereby obtain the sub-assembly SA illustrated in FIGS. 10 and 11.

The rod 2 of the above-described sub-assembly SA is inserted into the hollow rotation shaft 20 illustrated in each of FIGS. 1 to 3, and is assembled on the hollow rotation shaft 20 so that the sun gear 31 meshes with the planetary gear 32 and the ring gear 33. Then, the rod 2 is pushed in until the end surface of the holder 34 in the axial direction comes in contact with a side end surface of the snap ring 14. Next, the connection cover 11 is attached to the sub-assembly SA and the lock nut 13 is threadedly engaged with the cylindrical body 10. Thus, the outer ring 37b of the bearing 37 and the holder 34 are disposed between the snap ring 14 and the connection cover 11, and strongly held therebetween in the sandwiched manner. At this time, the rod 2 of the sub-assembly SA is inserted through the bushes 2a and 2b, which are arranged at the case 12, and is arranged to extend to an outside of the case 12.

Then, within the case 12, the magnet block 50 is arranged at the elongated groove 2r of the rod 2 and is assembled so that the holding portion 52 of the magnet block 50 is held between the standing wall portions 12w and 12w. The bolt 51 is fitted in the through hole 2h of the rod 2 by insertion and is threadedly engaged with the nut 54, and thus the rod 2 is supported at the housing 1 so as to be non-rotatable relative to the housing 1.

Further, the electronic circuit board 40 to which the displacement sensor 5a is attached is accommodated within the case 12, and the displacement sensor 5a is fixed at the position where the displacement sensor 5a faces the permanent magnet 5b. Then, after a wire harness is connected, each of the first and second cover portions 15 and 16 is connected, by a bolt, to the case 12 via an O ring OR serving as a seal member. Thus, an inside the case 12 is defined as a fluid-tight space portion. After the above-explained assembling, the ball joint JL is connected to an end of the rod 2, and a rubber boot BT is attached to the connected portion.

According to the aforementioned embodiment, the rear wheel steering apparatus for the vehicle, the rear wheel steering apparatus configured to be mounted on the suspension mechanism that supports the rear wheels RL, RR of the vehicle and steering the rear wheels RL, RR, the rear wheel steering apparatus includes the housing 1 configured to be connected via the ball joint JA and the ball joint JL to the suspension mechanism, the electric motor 3a accommodated within the housing 1, the planetary gear mechanism 30 including the sun gear 31 connected to the output shaft of the electric motor 3a, the ring gear 33 supported within the housing 1 to be non-rotatable, the planetary gear 32 meshing with the ring gear 33 and the sun gear 31, and the carrier 36 connected to the planetary gear 32, the planetary gear mechanism 30 decelerating the output of the electric motor 3a, the linear motion mechanism 3c including the nut member 36 connected to the planetary gear mechanism 30 and constituting the carrier 36, and the rod 2 threadedly engaged with the nut member 36 and connected to the ball joint JL, the linear motion mechanism 3c converting the rotary motion of the nut member 36 to the linear motion of the rod 2, the housing 1 including the cylindrical body 10 which accommodates the electric motor 3a and the planetary gear mechanism 30 in a state where the electric motor 3a and the planetary gear mechanism 30 are arranged in tandem with each other and which includes the lock portion (for example, the snap ring 14) provided at the inner surface of the cylindrical body 10 to be positioned between the electric motor 3a and the planetary gear mechanism 30, the housing 1 including the connection cover 11 including the ball joint JA and closing an opening portion of the cylindrical body 10, a holder 34 holding the ring gear 33 within the cylindrical body 10 in a state where the ring gear 33 constituting the planetary gear mechanism 30 is prevented from rotating, and the bearing 37 supporting the nut member 36 in a manner that the nut member 36 is rotatable relative to the holder 34, wherein the bearing 37 and the holder 34 are disposed and held between the snap ring 14 of the cylindrical body 10 and the connection cover 11, and the holder 34 is held to be non-rotatable relative to the cylindrical body 10.

According to the above-described configuration of the rear wheel steering apparatus of the aforementioned embodiment, the housing 1 includes the cylindrical body 10 which accommodates the electric motor 3a and the planetary gear mechanism 30 in a state where the electric motor 3a and the planetary gear mechanism 30 are arranged in tandem with each other and which includes the lock portion (for example, the snap ring 14) provided at the inner surface of the cylindrical body 10 to be positioned between the electric motor 3a and the planetary gear mechanism 30. The housing 1 includes the connection cover 11 including the ball joint JA and closing an opening portion of the cylindrical body 10. The rear wheel steering apparatus of the aforementioned embodiment includes the holder 34 holding the ring gear 33 within the cylindrical body 10 in a state where the ring gear 33 constituting the planetary gear mechanism 30 is prevented from rotating and the bearing 37 supporting the nut member 36 in a manner that the nut member 36 is rotatable relative to the holder 34, wherein the bearing 37 and the holder 34 are disposed and held between the snap ring 14 of the cylindrical body 10 and the connection cover 11, and the holder 34 is held to be non-rotatable relative to the cylindrical body 10. Consequently, the ring gear 33 constituting the planetary gear mechanism 30 is held strongly relative to the rotational direction of the ring gear 33, torque is reliably transmitted, the assembly is easily performed, and the costs and weight may be reduced.

According to the aforementioned embodiment, the ring gear 33 includes the engagement portion 33e protruding outwardly in the radial direction of the ring gear 33, and the holder 34 includes the locking portion 34c locking the engagement portion 33e in the circumferential direction of the holder 34.

According to the above-described configuration, the ring gear 33 includes the engagement portion 33e protruding outwardly in the radial direction of the ring gear 33, and the holder 34 includes the locking portion (for example, the groove 34c) locking the engagement portion 33e in the circumferential direction. Consequently, the rear wheel steering apparatus is manufactured and assembled easily and inexpensively.

According to the aforementioned embodiment, the locking portion 34c of the holder 34 includes the groove 34c accommodating the engagement portion 33e of the ring gear 33.

According to the above-described configuration, the locking portion of holder 34 may be constituted by the groove 34c accommodating the engagement portion 33e of the ring gear 33. In that case, the locking portion is formed easily.

According to the aforementioned embodiment, the ring gear 33 is made of the synthetic resin, and the engagement portion 33e of the ring gear 33 includes the protrusions 33f provided at both outer side surfaces of the engagement portion 33e, respectively, and the ring gear 33 is held by the holder 34 in a state where the protrusions 33f are in contact with both inner side surfaces of the groove 34c of the holder 34, respectively.

According to the above-described configuration, the ring gear 33 is made of the synthetic resin, and the engagement portion 33e of the ring gear 33 includes the protrusions 33f provided at both outer side surfaces of the engagement portion 33e, respectively, and the ring gear 33 is held by the holder 34 in a state where the protrusions 33f are in contact with both inner side surfaces of the groove 34c of the holder 34, respectively. Consequently, the ring gear 33 is reliably held at the holder 34 and the reliably-held-condition is maintained.

According to the aforementioned embodiment, the lock portion of the cylindrical body 10 includes the step provided at the inner surface of the cylindrical body 10.

According to the aforementioned embodiment, the lock portion of the cylindrical body 10 includes the snap ring 14 fixed at the inner surface of the cylindrical body 10.

According to the above-described configuration, the lock portion of the cylindrical body 10 is constituted by the step provided at the inner surface of the cylindrical body 10 or by the snap ring 14 fixed at the inner surface of the cylindrical body 10. Consequently, the rear wheel steering apparatus is manufactured and assembled easily and inexpensively.

According to the aforementioned embodiment, the cylindrical body 10 and the connection cover 11 are tightened to each other by the lock nut 13 formed in the annular shape.

According to the above-described configuration, the cylindrical body 10 and the connection cover 11 are tightened to each other by the lock nut 13 which is formed in an annular shape. Consequently, the assembly is performed easily and an axial load may be absorbed reliably.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A rear wheel steering apparatus for a vehicle, the rear wheel steering apparatus configured to be mounted on a suspension mechanism that supports rear wheels of the vehicle and steering the rear wheels, the rear wheel steering apparatus comprising:
   a housing configured to be connected via a first connection member and a second connection member to the suspension mechanism;
   an electric motor accommodated within the housing;
   a planetary gear mechanism including a sun gear connected to an output shaft of the electric motor, a ring gear supported within the housing to be non-rotatable, a planetary gear meshing with the ring gear and the sun gear, and a carrier connected to the planetary gear, the planetary gear mechanism decelerating an output of the electric motor;
   a linear motion mechanism including a nut member connected to the planetary gear mechanism and constituting the carrier, and a rod threadedly engaged with the nut member and connected to the second connection member, the linear motion mechanism converting a rotary motion of the nut member to a linear motion of the rod, the housing including a cylindrical body which accommodates the electric motor and the planetary gear mechanism in a state where the electric motor and the planetary gear mechanism are arranged in tandem with each other and which includes a lock portion provided at an inner surface of the cylindrical body to be positioned between the electric motor and the planetary gear mechanism, the housing including a connection cover including the first connection member and closing an opening portion of the cylindrical body;
   a cylindrical holding member holding the ring gear within the cylindrical body in a state where the ring gear constituting the planetary gear mechanism is prevented from rotating;
   a bearing supporting the nut member in a manner that the nut member is rotatable relative to the cylindrical holding member;
   wherein the bearing and the cylindrical holding member are disposed and held between the lock portion of the cylindrical body and the connection cover;
   the cylindrical holding member is held to be non-rotatable relative to the cylindrical body;

the ring gear includes an engagement portion protruding outwardly in a radial direction of the ring gear; and the cylindrical holding member includes a locking portion locking the engagement portion in a circumferential direction of the cylindrical holding member.

2. The rear wheel steering apparatus according to claim 1, wherein the locking portion of the cylindrical holding member includes a groove accommodating the engagement portion of the ring gear.

3. The rear wheel steering apparatus according to claim 2, wherein the ring gear is made of synthetic resin, and the engagement portion of the ring gear includes protrusions provided at both outer side surfaces of the engagement portion, respectively, and the ring gear is held by the cylindrical holding member in a state where the protrusions are in contact with both inner side surfaces of the groove of the cylindrical holding member, respectively.

4. The rear wheel steering apparatus according to claim 3, wherein the lock portion of the cylindrical body includes a step provided at the inner surface of the cylindrical body.

5. The rear wheel steering apparatus according to claim 4, wherein the cylindrical body and the connection cover are tightened to each other by a lock nut formed in an annular shape.

6. The rear wheel steering apparatus according to claim 3, wherein the lock portion of the cylindrical body includes a snap ring fixed at the inner surface of the cylindrical body.

7. The rear wheel steering apparatus according to claim 6, wherein the cylindrical body and the connection cover are tightened to each other by a lock nut formed in an annular shape.

8. The rear wheel steering apparatus according to claim 2, wherein the lock portion of the cylindrical body includes a step provided at the inner surface of the cylindrical body.

9. The rear wheel steering apparatus according to claim 8, wherein the cylindrical body and the connection cover are tightened to each other by a lock nut formed in an annular shape.

10. The rear wheel steering apparatus according to claim 2, wherein the lock portion of the cylindrical body includes a snap ring fixed at the inner surface of the cylindrical body.

11. The rear wheel steering apparatus according to claim 10, wherein the cylindrical body and the connection cover are tightened to each other by a lock nut formed in an annular shape.

12. The rear wheel steering apparatus according to claim 1, wherein the lock portion of the cylindrical body includes a step provided at the inner surface of the cylindrical body.

13. The rear wheel steering apparatus according to claim 4, wherein the cylindrical body and the connection cover are tightened to each other by a lock nut formed in an annular shape.

14. The rear wheel steering apparatus according to claim 1, wherein the lock portion of the cylindrical body includes a snap ring fixed at the inner surface of the cylindrical body.

15. The rear wheel steering apparatus according to claim 14, wherein the cylindrical body and the connection cover are tightened to each other by a lock nut formed in an annular shape.

* * * * *